United States Patent [19]

Yamada et al.

[11] 4,260,524
[45] Apr. 7, 1981

[54] HOLLOW CATALYST CARRIER AND HOLLOW CATALYST MADE OF TRANSITION-ALUMINA AND PROCESS FOR PRODUCTION THEREOF

[75] Inventors: Koichi Yamada; Kunio Nakazato; Kazuo Horinouchi; Seiichi Hamano; Masahide Mouri, all of Niihama, Japan

[73] Assignee: Sumitomo Aluminium Smelting Company, Limited, Osaka, Japan

[21] Appl. No.: 42,151

[22] Filed: May 24, 1979

[51] Int. Cl.³ .................... B01J 21/04; B01J 35/04
[52] U.S. Cl. ........................... 252/463; 252/477 R
[58] Field of Search .................. 252/463, 477 R; 423/628

[56] References Cited

U.S. PATENT DOCUMENTS

| | | | |
|---|---|---|---|
| 3,347,798 | 10/1967 | Baer et al. | 252/477 R |
| 3,839,224 | 10/1974 | Yonehara et al. | 252/477 R |
| 3,869,410 | 3/1975 | Bunda et al. | 252/477 R |
| 3,907,710 | 9/1975 | Lundsager | 252/477 R |
| 3,978,269 | 8/1976 | Martin | 252/477 R |
| 4,039,480 | 8/1977 | Watson et al. | 252/477 R |
| 4,077,908 | 3/1978 | Stenzel et al. | 252/477 R |

FOREIGN PATENT DOCUMENTS 763944  7/1967  Canada ........................... 252/477 R

*Primary Examiner*—W. J. Shine
*Attorney, Agent, or Firm*—Birch, Stewart, Kolasch & Birch

[57] ABSTRACT

A hollow catalyst carrier and hollow catalyst made of a transition-alumina (e.g. γ-alumina) which comprises a calcined product having a pipe-like or multi-cell structure and having a very large void ratio (i.e. not less than 3%), a very large specific surface area (i.e. not less than 5 m²/g), a bulk density of 0.8 to 1.8 g/cm³, a compressive strength in the extrusion direction of not less than 20 kg/cm² and at least one hole in the extrusion direction, and a process for the production thereof by subjecting a powder containing a rehydratable alumina to an extrusion molding, rehydrating the molded product and followed by calcining. The hollow catalyst carrier and hollow catalyst have excellent properties for carrying the catalytically active components thereon and have an excellent mechanical strength.

12 Claims, No Drawings

HOLLOW CATALYST CARRIER AND HOLLOW CATALYST MADE OF TRANSITION-ALUMINA AND PROCESS FOR PRODUCTION THEREOF

The present invention relates to a hollow catalyst carrier and hollow catalyst made of a transition-alumina and a process for the production thereof. More particularly, it relates to a hollow catalyst carrier and hollow catalyst which are made of a transition-alumina and have a very large pore volume and a very large specific surface area, and a process for the production of these hollow catalyst carrier and hollow catalyst.

It is well known that ceramic hollow products, particularly these having a multi-cell structure, have a number of uniform and parallel flow paths of gas, and hence, they have a highly decreased pressure drop and an uniform distribution of gas flow rate within the structure. Also, they have a large effective surface area per unit weight thereof because of the thin wall. Moreover, the products are very strong, while they are light in weight, and further have an excellent heat resistance. Owing to these various advantages, the ceramic hollow products have hitherto been used for a catalyst carrier, supporting material for various products, heat exchanger, heat insulating material, sound insulating material, or the like. Particularly, because of of the excellent impact strength and wearing characteristics thereof, an integral product of the ceramic hollow products has been watched as a catalyst carrier for the treatment of automobile exhaust gases and for the removal of nitrogen oxides.

The ceramic hollow products are usually produced from cordierite prepared by calcining a mixture of talc, bentonite, α-alumina, etc., spodumene, α-alumina, titania, zirconia, mullite, calcined kaolin, or the like. The ceramic products obtained from cordierite, spodumene, α-alumina or mullite have particularly excellent characteristics as a catalyst carrier because of an excellent mechanical strength and low thermal expansion. However, these ceramic hollow products have usually such a low specific surface area as less than 5 m$^2$/g and such a small pore volume as less than 0.2 cm$^3$/g, and hence, they are inferior in carrying of the catalytically active components and are not necessarily suitable as a catalyst carrier.

In order to enhance the ability for carrying the catalyst components, the ceramic products are usually coated with an activated alumina having high catalyst component-carrying properties by conventional methods such as dipping or spraying. However, the products are still inferior in the durability, because the coating of activated alumina is rather weakly adhered onto the surface of the ceramic and is peeled off during use of the catalyst.

As a result of the present inventors' intensive study, it has been found that an integral hollow product of a transition-alumina having a large pore volume and a large specific surface area has excellent properties for carrying catalyst components and hence is useful as a catalyst carrier.

An object of the present invention is to provide an improved catalyst carrier having excellent properties for carrying catalyst components. Another object of the invention is to provide a hollow catalyst, wherein catalyst components are tightly carried on the hollow catalyst carrier. A further object of the invention is to provide a process for the production of an integral hollow catalyst carrier and hollow catalyst using a transition-alumina. These and other objects of the present invention will be apparent from the following description.

The hollow catalyst carrier of the present invention is an integral, calcined product which comprises predominantly a transition-alumina and has a void ratio of not less than 3% in a cross section, a specific surface area of not less than 5 m$^2$/g, a bulk density of 0.8 to 1.8 g/cm$^3$ (the bulk density is of the substantial part other than void part and is measured by the method as disclosed in JIS R-2205), a pore volume of 0.3 to 0.8 cm$^3$/g, and a compressive strength in the extrusion direction of not less than 20 kg/cm$^2$ and has at least one hole in the extrusion direction, which can be prepared by forming an integral product of a raw material containing a rehydratable alumina powder by extrusion molding, rehydrating the resulting integral product, and then calcining the rehydrated product. The hollow catalyst of the present invention can be produced by carrying catalytically active components onto the hollow catalyst carrier obtained above.

The transition-alumina in the present invention includes alumina having a large specific surface area which is identified as the η-, γ-, χ-, δ- and θ- forms by X-ray diffraction, and comprises predominantly γ-alumina.

The hollow product produced by the extrusion molding includes all products having various hole shapes, such as circular, rectangular, and the like, and the products may be in the form of pipe-like which has a single opening hole and also multi-cell (honeycomb) structure which has holes of 400 to 600 per a square inch.

The hollow catalyst carrier and hollow catalyst made of a transition-alumina of the present invention is prepared by using as the starting material a rehydratable alumina. The rehydratable alumina includes all transition-alumina other than α-alumina which are obtained by subjecting alumina hydrate to heat decomposition, for instance, ρ-alumina, amorphous alumina, or the like. The transition-alumina can industrially be obtained by contacting an alumina hydrate, such as alumina trihydrate which is obtained by the Bayer process, with a heated gas of about 400° to 1200° C. for a fraction of a second to 10 seconds or by heating the alumina hydrate under reduced pressure at about 250°–900° C. for about 1 minute to 4 hours. The loss on ignition of such a transition-alumina is about 0.5 to 15% by weight.

The rehydratable alumina has usually a particle size of not more than about 50μ and is used in an amount of at least about 10% by weight, i.e. 10 to 100% by weight, preferably not less than 20% by weight, more preferably not less than about 30% by weight, based upon the total weight of the solid materials, i.e. the materials composing the hollow catalyst carrier and the hollow catalyst.

Other solid materials than the rehydratable alumina are not specified but include conventional inorganic materials which are usually used for producing a catalyst carrier, such as α-alumina, silica, alumina hydrate, clay, talc, bentonite, diatomaceous earth, zeolite, cordierite, spodumene, titania, zirconia, silica sol, alumina sol, mullite and also includes combustible materials and various catalytically active components.

These solid materials composing the hollow catalyst carrier other than the rehydratable alumina are used in an amount of less than about 90% by weight, i.e. 0 to less than 90% by weight, preferably less than 80% by weight, more preferably less than 70% by weight, based upon the total weight of the solid materials. The combustible materials are used in order to increase the pore volume on the thin wall of the final hollow catalyst carrier or hollow catalyst, and include all combustible materials which are usually used in the production of activated alumina having a large pore volume. Suitable examples of the combustible materials are wood scraps, cork particles, powdery coal, active carbon, charcoal, crystalline cellulose powder, methyl cellulose, carboxymethyl cellulose, starch, sucrose, gluconic acid, polyethylene glycol, polyvinyl alcohol, polyacrylamide, polyethylene, polystyrene, or a mixture thereof.

The larger the ratio of the combustible materials, the larger the macropore volume on the thin wall of the final hollow catalyst carrier or hollow catalyst. However, when the amount of the combustible materials is too large and the macropore volume is too large, the strength of the final product is decreased. Accordingly, the suitable amount and kind of the combustible material should be selected in accordance with the uses of the catalyst carrier and also catalyst.

The hollow catalyst carrier and hollow catalyst can be produced by using as the starting material the rehydratable alumina and other solid materials as mentioned above in the following manner:

(1) The rehydratable alumina is partially or wholly coated with an agent for preventing the rehydration, and then is mixed with water and/or a water-containing substance and optionally also other solid materials than the rehydratable alumina and further a binding agent, and the mixture is kneaded well to give a plastic mixture. The resulting plastic mixture is subjected to extrusion molding by using a pipe or multi-cell forming dies. The extrusion-molded product thus obtained is subjected to rehydration and optionally followed by drying, and then is activated by calcining.

(2) Alternatively, the rehydratable alumina is mixed with a non-aqueous substance which is liquid at a temperature of lower than 100° C. and optionally other solid materials than the rehydratable alumina and also a binding agent, and the mixture is kneaded well to give a plastic mixture. The resulting plastic mixture is treated in the same manner as in the above (1), i.e. to be subjected to the extrusion molding, rehydration, optionally drying, and finally calcination.

For the production of an extrusion-molded product from a ceramic powder, water and/or a water-containing substance is usually added to the starting ceramic mixture in order to give plasticity to the ceramic mixture. However, when the rehydratable alumina is mixed with water and/or a water-containing substance, the alumina is rehydrated and hence is exothermally cured during the extrusion molding, by which the extrusion molding can not be accomplished and the desired hollow catalyst carrier or hollow catalyst having good inner and outer walls (particularly, good inner wall) can not be obtained. Accordingly, in the present invention, the rehydratable alumina is previously coated with an agent for preventing rehydration before admixing with water or water-containing substance and other solid materials, or is mixed with a liquid non-aqueous substance without using water or a water-containing substance.

The agent for preventing rehydration includes all substances which can prevent the rehydration of the rehydratable alumina during the extrusion molding, particularly organic substances which are solid at room temperature and have a solubility of less than about 20% by weight, preferably less than about 10% by weight, in water at room temperature, and organic substances which are liquid at room temperature and have a solubility of less than about 50% by weight, preferably less than about 25% by weight, in water at room temperature. Suitable examples of the rehydration preventing agent are fatty acids and their salts, such as caproic acid, palmitic acid, oleic acid, glycolic acid, capric acid, stearic acid, salicylic acid, trimethylacetic acid, lauric acid, cerotic acid, cinnamic acid, malonic acid, myristic acid, sebacic acid, benzoic acid, or maleic anhydride; sulfonic or phosphoric acid derivatives of these fatty acids; alcohols such as t-butyl alcohol, lauryl alcohol, cetyl alcohol, stearyl alcohol, cyclohxanol, menthol, cholesterol, or naphthol; amines such as laurylamine, tetramethylenediamine, diethanolamine, or diphenylamine; alkanes such as n-heptadecane, n-octadecane, n-nonadecane, or n-eicosane; aromatic compounds such as naphthalene, diphenyl, or anthracene; waxes; natural high molecular weight compounds such as starches, casein, cellulose or its derivatives, or alginates; synthetic high molecular weight compounds such as polyethylene, polyvinyl alcohol, polyvinyl chloride, polypropylene, poly(sodium acrylate), polybutadiene, isoprene rubber, or urethane resin; paraffins such as liquid paraffin, soy bean oil, rape seed oil, light oil, or kerosene; carboxylic acids such as caprylic acid, or pelargonic acid; aromatic hydrocarbons such as benzene, toluene, xylene, or cumene; or the like.

The rehydration preventing agent is used in such an amount that the surface of the rehydratable alumina is at least partially coated with it by mixing directly with the alumina powder or by using a suitable means, for example, when the agent is solid and hence it is difficult to directly coat onto the alumina powder, by coating after being dissolved in an appropriate solvent such as an alcohol or ether, or when the agent is liquid, by dipping the alumina powder into the rehydration preventing agent or by coating with the vaporized agent, or in combination of these means.

Suitable amount of the rehydration preventing agent depends on the particle size distribution of the solid materials composing the hollow catalyst carrier, compositions, conditions for extrusion and also conditions for rehydration, but is usually in the range of 0.01 to 30% by weight based on the weight of the rehydratable alumina. When the amount of the rehydration preventing agent is smaller than 0.01% by weight, the prevention of rehydration can not sufficiently be done, and the product is exothermically cured during the extrusion molding. When the rehydration preventing agent is used also as the binding agent as mentioned hereinafter, the amount may be increased up to the maximum amount of the binding agent.

The binding agent used for the production of the present hollow catalyst carrier or hollow catalyst includes all conventional binding agents which are usually used for the production of alumina catalyst carrier, such as polyvinyl alcohol, starches, celluloses, or the like. The amount of the binding agent may also depend on the kind and particle size of the solid materials composing the hollow catalyst carrier or hollow catalyst, conditions for extrusion molding and conditions for rehydration, but is usually not more than 30% by weight based on the weight of the solid materials. When the binding agent is used in a too large amount, the molded product is distorted during the removal of the rehydration preventing agent after extrusion molding, and hence, the product has an inferior dimension stability and a lower strength. When the rehydration preventing agent functions also as a binding agent, only the deficient amount of the binding agent may be supplemented.

The rehydration preventing agent and the binding agent are used in a total amount of at least 2.5% by weight based on the weight of the solid materials composing the hollow catalyst carrier or hollow catalyst. When the starting alumina and other solid materials are mixed and kneaded with the non-aqueous substance, and if the non-aqueous substance functions as binding agent, any binding agent is no more added, but if the non-aqueous substance does not have any binding effect, a binding agent is added in an amount of at least 1.5% by weight.

The plastic mixture to be subjected to the extrusion molding may be prepared by subjecting the rehydratable alumina to rehydration preventing treatment, mixing the resulting alumina with other solid materials and a binding agent, and then mixing and kneading the mixture with water or a water-containing substance, or in case no rehydration preventing treatment is done, by mixing the rehydratable alumina with other solid materials and a binding agent and then mixing and kneading the mixture with a non-aqueous substance. The mixing and kneading of the mixture of solid materials with water or a water-containing substance or with a non-aqueous substance may be done prior to supplying to the extrusion molding machine, or in case of using an extrusion molding machine having a kneading function, the kneading may be carried out in it.

Water and water-containing substance may usually be used in an amount of about 20 to 70% by weight based upon the weight of the solid materials. The amount of non-aqueous substance may vary depending on the particle size distribution and components of the solid materials, conditions for the extrusion molding and conditions for the rehydration, but is usually in the range of about 2 to 100% by weight based upon the weight of the rehydratable alumina.

The water-containing substance includes an aqueous solution of an acid, an alkali, a catalytically active component, a binding agent, or other additives. Non-aqueous substance includes all substances which are liquid at a temperature of lower than about 100° C., for example, alcohols having 1 to 4 carbon atoms such as methanol, ethanol, or propanol; hydrocarbons such as hexane, or heptane; polyvalent alcohols such as ethylene glycol, or glycerin; paraffins such as soy bean oil, rape seed oil, light oil, or kerosene; carboxylic acids such as caprylic acid, or pelargonic acid; esters such as ethyl silicate, or methyl acetate; aromatic hydrocarbons such as benzene, toluene, xylene, or cumene; dioxane; or a mixture of these substances. Preferred non-aqueous substances are dioxane, ethanol, propanol, ethylene glycol, glycerin, and rape seed oil, which are liquid at the temperature for kneading, i.e. at 10° C. higher than the room temperature.

The extrusion molding does not necessarily require a releasing agent, but a saturated fatty acid or a salt thereof, such as stearic acid, calcium stearate or the like, may be added when the starting mixture is kneaded. These releasing agents are usually used in an amount of 0 to 5% by weight based upon the weight of the solid materials.

The extrusion molding can be carried out by any type of extrusion molding machine which can form a pipe-like or multi-cell structural molded product having a void ratio in a cross section of not less than 3%, i.e. 3 to 95%, preferably 20 to 90%, for example, an extrusion molding machine which can give multi-cell structural molded products as disclosed in U.S. Pat. No. 3,559,252, Japanese Patent Publication No. 1232/1976 and Japanese Patent Publication (unexamined) No. 55960/1973; that which can give multi-cell structural molded products having fins which extend from the thin wall toward the center of core in order to improve the contact efficiency of the gas to be treated which passes through the core of the catalyst carrier or catalyst, as disclosed in Japanese Patent Publication (unexamined) No. 127886/1975; that which can give multi-cell structural molded products wherein at least one direction of thin wall is bent in the extrusion direction in order to prevent cracking and distortion of the product due to expansion or shrinkage of the multi-cell forming materials during the drying or calcining of the product, as disclosed in Japanese Patent Publication (unexamined) No. 565/1976; and that which can give multi-cell structural products having a collaring on the surrounding thin wall or having a surrounding thick wall in order to improve the impact strength of the product.

The hollow products of the present invention can also be produced by injection molding and transfer molding.

The outer shape and the hole shape of the hollow products may be in any geometrical form such as square, rectangle, triangle, hexagon, circle, or the like. Furthermore, number of hole, wall thickness of cells, length of the molded products, sectional area of each cell, and the total sectional area of the hollow product (outer shape) having the pipe-like or multi-cell structure may appropriately be determined depending on the use of the products.

The hollow products obtained by extrusion molding are subjected to the rehydration treatment in order to enhance the impact strength and mechanical strength. The rehydration treatment can give the hollow products sufficient strengths without forming ceramic bond by sintering.

The rehydration can be done by the conventional methods which are used in the production of activated alumina, and is usually carried out at a temperature of from room temperature to 150° C., preferably by keeping in steam or steam-containing gas having a temperature of 80° to 100° C., or by keeping in water at room temperature or higher, more preferably at higher than 80° C. When the used rehydration preventing agent is insoluble in water at the above temperature range for rehydration, such as polyvinyl chloride, the hollow products are immersed in an appropriate solvent such as alcohols, ethers, or esters, by which the coating layer is destroyed or dissolved out and the hollow products are rehydrated with water which is contained in the molded products. When a non-aqueous substance having a solubility of not less than 5% by weight at room temperature is used, the rehydration may preferably be carried out under mild conditions, for instance, by using water diluted with a hydrophilic solvent (e.g. alcohols) or by carrying out in steam, in view of shape retention of the products.

The rehydration is usually carried out for about one minute to one week. When the rehydration time is longer and the rehydration temperature is higher, the bonding reaction of the hollow products proceeds more and hence there can be obtained the products having a larger mechanical strength. When the rehydration temperature is higher, the rehydration time can be made shorter. The rehydration may also be done by allowing to keep the product in a sealed vessel at room temperature and under atmospheric pressure for a long period of time.

The rehydrated hollow products thus obtained are then dried by natural drying, hot-air drying, or vacuum drying, by which moisture adhered onto the products is removed, and thereafter, the products are further heat-treated at about 100° to 1100° C., by which moisture included within the products is removed and the products are activated. The drying step is not essential, but the hollow products may directly be subjected to calcination with mildly raising temperature, for example, the hollow products are calcined at room temperature to 300° C. for 48 hours and then at 300° to 1100° C. for 6 to 12 hours.

When the hollow products contain any combustible material, the products are heated at higher than about 250° C. during the calcination, by which the combustible material is removed. When the removal of the combustible material and the activation of the hollow products are simultaneously carried out, the hollow products containing combustible material is put on a bed and thereto a hot air or combustion gas containing a sufficient amount of oxygen is passed.

The hollow catalyst carrier obtained above is composed of crystalline phase of transition-alumina comprising predominantly $\gamma$-alumina and has a specific surface area of not less than 5 m$^2$/g, preferably 10 to 500 m$^2$/g, a bulk density of 0.8 to 1.8 g/cm$^3$, a pore volume of 0.3 to 0.8 cm$^3$/g, a compressive strength of not less than 20 kg/cm$^2$, preferably 30 to 500 kg/cm$^2$, in the extrusion direction, and further has a multi-cell structure having wall thickness of less than 1 mm as like as the conventional multi-cell structural catalyst carrier made of ceramic.

The hollow catalyst carrier of the present invention is distinguished from the conventional spherical or cylindrical catalyst carrier made of an activated alumina in the fact that the hollow products of the present invention have a void ratio in a cross section of not less than 3%, and have a larger specific surface area and larger pore volume and hence can be used for the treatment of exhaust gases with less pressure drop in comparison with the conventional spherical or cylindrical catalyst carrier. Moreover, the mechanical strength such as a compressive strength of the hollow products is given by the rehydration treatment followed by calcination at 100° to 1100° C. contrary to the conventional ceramic hollow products wherein the products are sintered at such a high temperature as 1200° to 2000° C. and thereby the strength is given by the ceramic bonding. Thus, since the hollow catalyst carrier of the present invention can be produced by calcining at a lower temperature, the cost for calcination apparatus, maintenance of the apparatus and fuel is very low.

The hollow products obtained above may further be modified by incorporating a specific substance into the starting solid materials or by impregnating a specific substance into the hollow products in order to fit them to specific uses, such as a catalyst carrier for automobile which requires a greater heat resistance and impact strength. For instance, an organic silicon compound is added to the solid materials composing the hollow products or is carried on the hollow products before or after the rehydration treatment. The organic silicon compound incorporated into or carried on the hollow products is oxidized or heat-decomposed during the subsequent calcination step and thereby the hollow products show durable activity for a long period of time owing to the delayed transition of $\gamma$-alumina to $\alpha$-alumina.

The organic silicon compound includes all compounds which can release silicon dioxide by oxidation or heat-decomposition thereof, for example, organoacetoxysilanes such as acetoxytrimethylsilane, acetoxytriethylsilane, diacetoxydimethylsilane, or diacetoxydiethylsilane; organoalkoxysilanes such as methoxytriethylsilane, or dimethoxydimethylsilane; organodisilanes such as hexamethyldisilane, or hexaethyldisilane; organo-silanols such as trimethylsilanol, dimethylphenylsilanol, triethylsilanol, diethylsilanol, or triphenylsilanol; organosilanecarboxylic acids; organosilmethylene, organopolysiloxane; organohydrogenosilane; organopolysilane; silicone tetrachloride; or the like.

The organic silicon compound is incorporated into or carried on the hollow products in an amount of 0.01 to 30 % by weight, preferably 0.1 to 10% by weight, (converted into SiO$_2$) based upon the weight of the alumina. Use of the silicon compound in an amount of over 30% by weight is not favorable from the economical view point, and on the other hand, use of smaller than 0,01% by weight is not favorable from the viewpoint of less effect on the improvement of heat resistance.

It is not made clear why the catalyst carrier made of transition-alumina is maintained with less decrease of the reactivity and has an excellent impact strength and heat resistance for a long period of time by incorporation or carrying of the organic silicon compound, it is assumed that silicon dioxide derived from the organic silicon compound is very fine and has an extremely high reactivity and hence the silicon dioxide is reacted with the activated alumina contained in the catalyst carrier to form an alumina-silicon dioxide reaction product on the surface of the activated alumina at a temperature at which the activated alumina does not convert into $\alpha$-alumina, and thereby the transition of $\gamma$-alumina into $\alpha$-alumina is inhibited.

The hollow catalyst carrier made of a transition-alumina may further be contacted with a mineral acid after the activation treatment, washed with water and then dried, by which there can be obtained a catalyst carrier having a larger macropore volume and having a high activity. Suitable examples of the mineral acid are hydrochloric acid, nitric acid, sulfuric acid, which are usually used in an aqueous solution having a concentration of about 0.1 to 10 N.

Contact of the catalyst carrier with the mineral acid is usually carried out by immersing the catalyst carrier in an aqueous solution of a mineral acid for about 10 minutes or longer. When the contacting time is shorter than 10 minutes, the desired effect for enlarging the macropore volume can not be achieved. The contacting temperature is not critical, but is preferably not higher than 100° C.

The hollow catalyst of the present invention can be produced by mixing previously the catalytically active components with the solid materials composing the catalyst carrier or by carrying the catalytically active components on the hollow catalyst carrier by conventional methods such as immersing or spraying. When the active component is previously mixed with the solid materials, it is added to the mixture before or after treatment of rehydratable alumina with a rehydration preventing agent, or before or during the kneading of the mixture of solid materials and a non-aqueous substance.

The catalytically active components useful in the present invention include all components which are usually used for the conventional catalysts carried on an activated alumina carrier. For example, the hollow catalyst containing at least one of platinum (Pt), ruthenium (Ru), rhodium (Rh) and palladium (Pd) is used for non-selective removal of nitrogen oxides (NOx) from exhaust gases from various stationary origins such as factories, selective removal of NOx by reduction with $NH_3$, oxidation of CO and hydrocarbons or reduction of NOx contained in exhaust gases of automobiles, and deodorizing of various industrial exhaust gases. The hollow catalyst containing at least one of oxides of metals selected from copper (Cu), iron (Fe), cobalt (Co), nickel (Ni), manganese (Mn) and vanadium (V) is used for selective removal of NOx in exhaust gases by reduction with $NH_3$, oxidation of CO and hydrocarbons or reduction of NOx contained in exhaust gases of automobiles, deodorizing of various industrial exhaust gases, and decomposition of NO. Moreover, the hollow catalyst containing at least one of oxides of metals selected from vanadium (V), molybdenum (Mo), tangsten (W), chromium (Cr), titanium (Ti), zinc (Zn), zirconium (Zr), niobium (Nb), silver (Ag), cerium (Ce), tin (Sn), rhenium (Re), and tantalum (Ta) is used for selective removal of NOx of exhaust gases by reduction with $NH_3$, oxidation of CO and hydrocarbons or reduction of NOx contained in exhaust gases of automobiles.

The present invention is illustrated by the following Examples but is not limited thereto. In Examples, "part" means part by weight unless specified otherwise.

EXAMPLE 1

Stearic acid (2 parts) was added to activated alumina powder (100 parts) which contained 30 parts of $\rho$-alumina (average particle size: about $6\mu$) obtained by calcining a gibbsite type alumina hydrate. The mixture was mixed well with a mixing machine for 2 hours, and thereby surface of the alumina was coated with stearic acid. To the mixture were added methyl cellulose (5 parts) and water (50 parts), and the mixture was kneaded with a kneader for 30 minutes and thereafter was extruded by a screw type extruder to obtain a multi-cell product (size: about 100 mm × 100 mm × 150 mm length, void ratio: 69.4%) having a wall thickness of 0.4 mm and square cell unit (a side of the square: 2 mm).

The multi-cell product thus obtained was subjected to rehydration in steam for 2 hours and heated up to 700° C. with raising the temperature at a rate of 100° C./hour and then calcined at 700° C. for one hour.

The multi-cell structural catalyst carrier thus obtained had a compressive strength of 60 kg/cm², a specific surface area of 150 m²/g, a pore volume of 0.6 cm³/g, a bulk density of 1.21 g/cm³ and the alumina composing the multi-cell comprised predominatly $\gamma$-alumina according to X-ray diffraction.

EXAMPLE 2

To a powdery mixture of activated alumina powder (70 parts) containing 50 parts of $\rho$-alumina (average particle size: about $5\mu$) and 30 parts of $\alpha$-alumina powder (average particle size: about $5\mu$) was added sodium alginate (0.5 part), and the mixture was mixed well with a mixing machine for one hour and thereby surface of the alumina powder was coated with sodium alginate. To the resulting powder were added methyl cellulose (10 parts) and water (40 parts), and the mixture was kneaded with a kneader for 30 minutes and thereafter was extruded by a screw type extruder to obtain a multi-cell product (size: 100 mm$\phi$ × 150 mm length, void ratio: 64%) having a wall thickness of 1 mm and square cell unit (a side of the square: 4 mm).

The multi-cell product thus obtained was put in a sealed room and was subjected to rehydration reaction at room temperature for one week, and thereafter heated up to 600° C. with raising the temperature at a rate of 50° C./hour and then calcined at 600° C. for one hour.

The multi-cell structural catalyst carrier thus obtained comprised predominantly $\gamma$-alumina according to X-ray diffraction and had a compressive strength of 55 kg/cm², a specific surface area of 160 m²/g, a pore volume of 0.45 cm³/g, and a bulk density of 1.25 g/cm³.

EXAMPLE 3

To a powdery mixture (100 parts) of $\rho$-alumina (average particle size: about $5\mu$, 40 parts), x-alumina (40 parts) and $\alpha$-alumina (20 parts) was added rape seed oil (1 part), and the mixture was mixed well with a mixing machine for one hour and thereby surface of the alumina powders was coated with rape seed oil. To the resulting alumina powders were added methyl cellulose (8 parts), spodumene (15 parts) and water (60 parts), and the mixture was kneaded with a kneader for 30 minutes and thereafter was extruded by a screw type extruder to obtain a multi-cell product (size: about 100 mm × 100 mm × 150 mm length, void ratio: 75.6%) having a wall thickness of 0.3 mm and square cell unit (a side of the square: 2 mm).

The multi-cell product thus obtained was immersed in water of 95° C. for 240 minutes to effect rehydration, and thereafter was dried with hot air of 80° C., and then heated up to 700° C. with raising the temperature at a rate of 100° C./hour and calcined at 700° C. for one hour.

The multi-cell structural catalyst carrier thus obtained had a compressive strength of 90 kg/cm², a specific surface area of 120 m²/g, a pore volume of 0.47 cm³/g, a bulk density of 1.75 g/cm³, and the alumina composing the multi-cell comprised predominantly $\gamma$-alumina according to X-ray diffraction.

EXAMPLE 4

Alumina hydrate obtained by the Bayer process was calcined with a hot gas of 700°–800° C. instantaneously (about 10 seconds) to give rehydratable alumina.

To the alumina thus obtained (100 parts) were added ethylene glycol (40 parts) and methyl cellulose (5 parts), and the mixture was kneaded with a kneader and thereafter was extruded with a screw type extruder to obtain a multi-cell product (size: about 100 mm × 100 mm × 150 mm length, void ratio: 69.9%) having a wall thickness of 0.4 mm and a honeycomb section (a side of the section: 2 mm).

The multi-cell product thus obtained was rehydrated in steam for 2 days and dried in a vessel of a constant temperature of 80° C. overnight, and thereafter, it was heated up to 300° C. with raising the temperature at a rate of 50° C./hour and further up to 600° C. with raising at a rate of 100° C./hour and then was calcined at 600° C. for 5 hours.

The multi-cell structural catalyst carrier thus obtained had a compressive strength of 50 kg/cm², a specific surface area of 150 m²/g, a pore volume of 0.6 cm³/g, a bulk density of 1.23 g/cm³ and the alumina composing the multi-cell comprised predominantly γ-alumina according to X-ray diffraction.

EXAMPLE 5

To the same rehydratable alumina (100 parts) as prepared in Example 4 were added cordierite (50 parts), starch (10 parts) and glycerin (30 parts), and the mixture was kneaded with a kneader and then extruded with a screw type extruder to obtain a multi-cell product (size: about 100 mm×100 mm×150 mm length, void ratio: 69.9%) having a wall thickness of 0.4 mm and a square section (a side of the square: 2 mm).

The multi-cell product thus obtained was rehydrated in steam for 2 days and dried in a vessel having a constant temperature of 80° C. overnight, and thereafter, it was heated up to 700° C. with raising the temperature at a rate of 100° C./hour and then calcined at 700° C. for one hour.

The multi-cell structural catalyst carrier thus obtained had a compressive strength of 50 kg/cm², a specific surface area of 120 m²/g, a pore volume of 0.35 cm³/g, a bulk density of 1.46 g/cm³ and the alumina composing the multi-cell comprised predominantly γ-alumina according to X-ray diffraction.

EXAMPLE 6

The multi-cell product obtained by molding and rehydrating in the same manner as described in Example 1 was heated up to 1100° C. with raising the temperature at a rate of 100° C./hour and then calcined at 1100° C. for one hour.

The multi-cell structural catalyst carrier thus obtained had a compressive strength of 50 kg/cm², a specific surface area of 20 m²/g, a pore volume of 0.4 cm³/g, a bulk density of 1.47 g/cm³, and the alumina composing the multi-cell comprised predominantly θ-alumina according to X-ray diffraction.

REFERENCE EXAMPLE 1

To cordierite powder (average particle size: about 8μ, 100 parts) were added methyl cellulose (4.5 parts) and water (25 parts), and the mixture was kneaded with a kneader for 30 minutes, and thereafter, it was extruded with the same extruder as used in Example 1, and then dried and subsequently it was heated up to 1300° C. with raising the temperature at a rate of 100° C./hour and calcined at this temperature for 5 hours.

The ceramic multi-cell structural catalyst carrier thus obtained had a compressive strength of 250 kg/cm², a specific surface area of 0.2 m²/g, and a pore volume of 0.20 cm³/g.

REFERENCE EXAMPLE 2

To mullite powder (average particle size: about 5μ, 100 parts) were added methyl cellulose (5 parts) and water (26 parts), and the mixture was kneaded with a kneader for 30 minutes, and thereafter, it was extruded with the same extruder as used in Example 1, and then it was dried and heated up to 1450° C. with raising the temperature at a rate of 100° C./hour and sintered at this temperature for 10 hours.

The multi-cell structural catalyst carrier thus obtained had a compressive strength of 300 kg/cm², a specific surface area of 0.3 m²/g, and a pore volume of 0.15 cm³/g.

REFERENCE EXAMPLE 3

Crystalline cellulose (10 parts) was added to activated alumina powder (100 parts) containing 30 parts of ρ-alumina (average particle size: about 6μ) which was prepared by calcining gibbsite type alumina hydrate. While adding water (50 parts) thereto, the mixture was formed to a spherical product of 3 mmφ with a dish type granulating machine.

The spherical product thus obtained was rehydrated in steam for 2 days and dried, and thereafter, it was heated up to 700° C. with raising the temperature at a rate of 100° C./hour and calcined at this temperature for one hour. The spherical product of acticated alumina had a compressive strength of 10 kg/cm², a specific surface area of 180 m²/g, and a pore volume of 0.7 cm³/g.

REFERENCE EXAMPLE 4

Stearic acid (0.5 part) was added to a mixture of the same activated alumina powder (50 parts) as used in Example 1 and α-alumina (average particle size: 5μ, 50 parts), and the mixture was mixed well with a mixing machine for 2 hours and thereby surface of the alumina powders was coated with stearic acid. To the alumina powders were added methyl cellulose (1.5 part) and water (35 parts) and the mixture was kneaded with a kneader for 30 minutes. The kneaded mixture was subjected to extrusion by using the same extruder as used in Example 1, but it could not be extruded.

The above procedure was repeated except that water was used in an amount of 45 parts instead of 35 parts. As a result, the extrusion could be done, but the formed product had an extremely inferior shape retention.

EXAMPLE 7

Vanadium oxide (V₂O₅) of 15% by weight based upon the weight of the catalyst carrier was carried on the catalyst carriers obtained in the above Examples 1 to 6 and Reference Examples 1 to 3. The catalyst thus obtained were each packed into a reactor, the inlet temperature of which was kept at 350° C. To the reactor was introduced a synthetic gas (NO: 100 ppm, NH₃: 100 ppm, O₂: 1.2% by volume, H₂O: 18.0% by volume, the remainder: N₂) at the space velocity as shown in the following Table 1, and the removal rate of NOx and the pressure drop were measured. The results are shown in Table 1.

TABLE 1

| Catalyst carrier | Space velocity: 8000 hr⁻¹ | | Space velocity: 2000 hr⁻¹ | |
| --- | --- | --- | --- | --- |
| | Removal rate of NOx (%) | Pressure drop (mm, H₂O) | Removal rate of NOx Pressure drop (%) | (mm, H₂O) |
| Example 1 | 98 | 3 | 90 | 7 |
| Example 2 | 90 | 2 | 80 | 5 |
| Example 3 | 98 | 3 | 90 | 7 |
| Example 4 | 98 | 3 | 90 | 7 |
| Example 5 | 98 | 3 | 90 | 7 |
| Example 6 | 78 | 3 | 72 | 7 |
| Ref. Ex. 1 | 25 | 3 | 20 | 7 |
| Ref. Ex. 2 | 30 | 3 | 26 | 7 |
| Ref. Ex. 3 | 98 | 30 | 90 | 200 |

As is clear from the above results in Table 1, the multi-cell catalyst carrier of the present invention can give excellent catalyst having greater removal rate of nitrogen oxides in comparison with other multi-cell catalyst carriers, and further shows extremely lower pressure drop in comparison with the spherical product of activated alumina.

What is claimed is:

1. A hollow catalyst carrier which consists essentially of an integral calcined product comprising predominantly a transition-alumina and having a void ratio in the cross section of not less than 3%, a specific surface area of not less than 5 m$^2$/g, a bulk density of 0.8 to 1.8 g/cm$^3$, a pore volume of 0.3 to 0.8 cm$^3$/g, a compressive strength in the extrusion direction of not less than 20 kg/cm$^2$ and at least one hole in the extrusion direction, said calcined product being prepared by subjecting a powder containing a rehydratable alumina to an extrusion molding, rehydrating the molded product and followed by calcining.

2. A hollow catalyst carrier according to claim 1, wherein the transition-alumina is $\gamma$-alumina.

3. The hollow catalyst carrier according to claim 1, which has a multi-cell structure having holes of 400 to 600 per square inch.

4. A process for the production of a hollow catalyst carrier having a void ratio in the cross section of not less than 3%, a specific surface area of not less than 5 m$^2$/g, a bulk density of 0.8 to 1.8 g/cm$^3$, a compressive strength in the extrusion direction of not less than 20 kg/cm$^2$ and at least one hole in the extrusion direction, which comprises (i) coating a rehydratable alumina or a rehydratable alumina-containing alumina powder with a rehydration preventing agent, mixing the coated alumina with water and/or a water-containing substance and optionally solid materials other than the rehydratable alumina composing the hollow catalyst carrier, and kneading the mixture to give a plastic mixture, (ii) extruding the plastic mixture to form a hollow shape, rehydrating the hollow product, and optionally drying, and (iii) calcining the resulting product.

5. A process for the production of a hollow catalyst carrier according to claim 4, wherein the starting rehydratable alumina is used in an amount of 10 to 100% by weight based upon the total weight of the solid materials composing the hollow catalyst carrier.

6. A process for the production of a hollow catalyst carrier according to claim 4, wherein the rehydration preventing agent is used in an amount of 0.01 to 30% by weight based upon the weight of the rehydratable alumina.

7. A process for the production of a hollow catalyst carrier according to claim 4, wherein water and/or water-containing substance is used in an amount of 20 to 70% by weight based upon the weight of the solid materials.

8. A process for the production of a hollow catalyst carrier according to claim 4, wherein the calcination is carried out at 100° to 1100° C.

9. A process for the production of a hollow catalyst carrier having a void ratio in the cross section of not less than 3%, a specific surface area of not less than 5 m$^2$/g, a bulk density of 0.8 to 1.8 g/cm$^3$, a compressive strength in the extrusion direction of not less than 20 kg/cm$^2$ and at least one hole in the extrusion direction, which comprises (i) mixing a rehydratable alumina or a rehydratable alumina-containing alumina powder with a non-aqueous substance, and optionally a releasing agent, a binding agent and solid materials other than the rehydratable alumina, kneading the mixture to give a plastic mixture, and then extruding the plastic mixture to form a hollow shape, (ii) rehydrating the hollow product and optionally drying, and (iii) calcining the resulting product.

10. A process for the production of a hollow catalyst carrier according to claim 9, wherein the non-aqueous substance is used in an amount of 2 to 100% by weight based upon the weight of the rehydratable alumina.

11. A process for the production of a hollow catalyst carrier according to claim 9, wherein the calcination is carried out at 100° to 1100° C.

12. A process for the production of a hollow catalyst, which comprises carrying a catalytically active component on a hollow catalyst carrier produced by the process as set forth in any one of claims 4 to 11.

* * * * *